United States Patent Office 3,262,712
Patented July 26, 1966

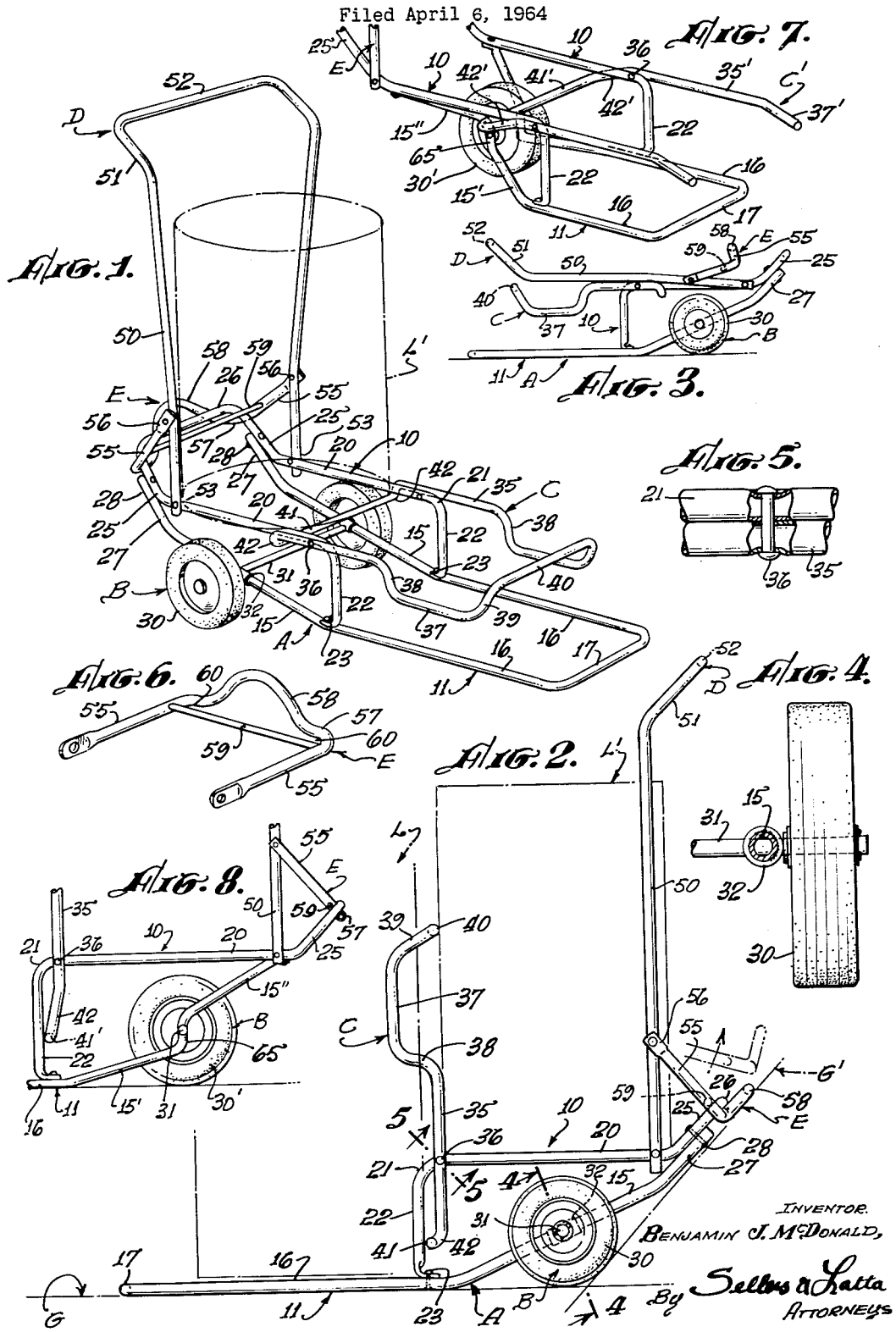

3,262,712
UTILITY HAND TRUCK
Benjamin J. McDonald, 15410 Wyandotte St., Van Nuys, Calif.
Filed Apr. 6, 1964, Ser. No. 357,719
6 Claims. (Cl. 280—47.19)

This invention relates to utility hand trucks and has as its general object to provide an improved truck especially adaptable for home use and for moving various types of loads such as trash cans, boxes, and other loads of various types. Objects of the invention are to provide a hand truck:

(1) Adapted for simultaneously supporting and transporting two large-size trash containers;

(2) Convertible from a dual trash can carrier to a long horizontal platform truck for carrying a load that is long horizontally;

(3) Having a travel wheel unit and a rear end frame portion which is inclined upwardly and rearwardly when a forward platform portion thereof is resting against the ground, the truck being tiltable rearwardly around the wheel unit to bring such rear end frame portion against the ground in a second rest position;

(4) Of open frame, lightweight yet very sturdy construction;

(5) Having an elevated rear platform and a low forward platform in stepped relation to one another for supporting a pair of trash cans in positions which are substantially levelled horizontally when the truck is tilted rearwardly to the travel position;

(6) Having means for cradling a pair of trash cans so as to retain them against lateral displacement while being transported;

(7) The retaining means being such as to retain the two trash cans in fixed position relative to the truck while the truck is tilted from an upstanding loading position to a rearwardly tilted travel position;

(8) The retaining means including a shiftable yoke operable in a raised position to provide a back support and lateral retainer for the forward can and, in a lowered position, providing a forward extension of the elevated rear platform for supporting a load that is relatively long horizontally;

(9) The truck being foldable for shipment and storage purposes;

(10) The truck handle having novel latching means for providing a sturdy fixed connection to the truck chassis in its use position and readily disengageable for folding the handle forwardly to the folded position.

Other objects and advantages will become apparent in the ensuing specification and appended drawing in which:

FIG. 1 is a perspective view of my hand truck in one form, viewed from the rightward side;

FIG. 2 is a leftward side elevational view of the same with the ground line shown in full lines for the upstanding loading position of the truck and shown in phantom to illustrate the rearwardly tilted rest position of the truck;

FIG. 3 is a leftward side elevational view of the truck in folded condition;

FIG. 4 is a vertical sectional view of the wheel support portion of the truck taken as indicated by line 4—4 of FIG. 2;

FIG. 5 is a fragmentary sectional view of the swinging yoke hinge taken on the line 5—5 of FIG. 2;

FIG. 6 is a perspective view of the handle latch unit;

FIG. 7 is a perspective view of the chassis portion of a truck embodying a modified form of the invention; and FIG. 8 is a leftward side elevational view of the same.

Referring now to the drawings in detail and in particular to FIGS. 1 and 2, I have shown therein, as an example of one form in which the invention may be embodied, a hand truck comprising, in general, a chassis section A providing an elevated rear platform 10 and a relatively low forward platform 11; a wheel unit B providing a rolling support for the chassis section A; a swinging yoke C hinged to the upper platform 10 for movement between a lowered horizontal position projecting forwardly to provide an extension of upper platform 10 and a raised vertical position (FIG. 2) providing a back support and lateral retainer for a forward trash can; a handle yoke D hinged to the rear end of chassis section A for swinging movement between an upstanding operative position shown in FIG. 1 and a forwardly projecting lower position in which the truck is folded for shipment etc. as illustrated in FIG. 3; and the latch unit E for securing the handle D to the chassis A in its raised operative position.

For maximum strength and ruggedness, the units A, C, D and E are fabricated almost entirely of metal (aluminum or steel) tubing or equivalent material, formed to their required configurations by bending operations. The chassis A comprises a pair of laterally spaced wheel frame rails 15 to which the wheel unit B is attached, the rails 15 being extended forwardly to provide the respective side rails 16 of forward platform 11, and being integrally joined by a transverse forward cross bar 17. The forward platform 11 is designed to rest flatly against the ground as indicated at G in FIG. 2, and the wheel frame rails 15 are bent with reference to rails 16 so as to be inclined upwardly and rearwardly in a plane of the axis of wheel unit B. The rails 15 extend rearwardly of the wheel unit B, to join a rearward extension of rear platform 10.

Upper platform 10 comprises a pair of side rails 20 which are integrally joined by respective elbow bends 21 to a pair of legs 22 extending downwardly therefrom and secured at 23 to the rear extremities of the forward platform 16, at the bends joining the latter to the chassis rails 15. Formed as continuations of the platform rails 20 are arms 25 of a tail yoke including a rear cross bar 26 integrally joining and bridging between the rear ends of arms 25. Wheel frame rails 15 terminate in upwardly bent brace arms 27 which are secured at 28 to the yoke arms 25. The tail yoke 25, 26 functions as a rigidifying transverse rear end member for the rails 15 and for rear platform 10 and, in addition, is utilized as a portion of the latching mechanism for handle yoke D.

Wheel unit B comprises a pair of wheels 30 mounted on respective ends of an axle 31 projecting beyond the respective wheel frame rails 15. Axle 31 extends through holes bored in the rails 15, and through reinforcing collars 32 at the joints.

Swinging yoke C comprises a pair of arms 35 which are disposed in embracing relation to the rear platform rails 20 and are attached thereto by pivots 36. The arms 35 have forwardly offset outer end portions 37, joined thereto by offsets 38. At their outer ends, offset arm portions, 37 are reversely bent at 39 and bridged by a cross bar 40 which is disposed in the plane of arms 35. At their inner ends, arms 35 are bridged by a cross bar 41 to which they are joined by respective offsets 42 having a depth corresponding to the diameter of the side rails of platform 10, so that the cross bar 41 may engage beneath the rails 20 while the arms 35 are disposed in the common plane of the rails 20 (FIG. 1). With the cross bar 41 thus fulcrumed against the undersides of rails 20, the swinging yoke C will be supported in the forwardly projecting horizontal position shown in FIG. 1, wherein it provides a forward extension of the upper rear platform 10 for supporting relatively long horizontally extended loads such as crates, boxes, bales of peat moss, tool trays, etc. When shifted upwardly to the vertical position shown in FIG. 2, the swinging yoke C provides a back support for a trash can L supported in an upright position upon the lower forward platform 11, and a forward bracing support to engage the forward side of a second trash can L' supported in an upstanding position upon the upper rear platform 10. In the elevated position of swinging yoke C, its inward cross bar 41 will abut against the back sides of the vertical legs 22 of platform 10. The back side of forward can L, near its lower end, will abut the cross bar 41, thereby deriving support therefrom at its lower end. At the same time, the forwardly offset arm portions 37 of swinging yoke C will embrace an upper rear portion of the can L and will engage opposite sides thereof to provide a combination of back support and lateral support to the upper portion of the can. Accordingly, when the truck is tilted rearwardly to a travel position (e.g. wherein its relationship to the ground line is approximately that indicated by the phantom showing of the ground line at G' in FIG. 2) the can will be cradled in the V-shape space defined between lower forward platform 11 and swinging yoke C, and its rear side will bear against the cross bar 41 and forward arm portions 37 of the swinging yoke, with the arms portions 37 embracing the can sufficiently to prevent it from shifting laterally. It may be noted at this point that the relationship between lateral spacing of platform bars 16 and of platform bars 20, and the bottom diameter of the cans L, L' respectively is such that these supporting bars will engage beneath the can bottoms at respective sides thereof along approximately 90° chords of the respective bottom peripheries, the cans being centered so that the areas of engagement will be substantially equalized by the cradling engagement of the can L between yoke arms 37 and of the can L' between the arms of handle yoke D. The engagement of a can bottom against respective platform rails is indicated approximately in FIG. 1, wherein can L' is shown in phantom and its bottom is illustrated by a broken elliptical line.

Handle yoke D comprises a pair of side arms 50, preferably bent rearwardly at their upper ends at 51 and integrally joined by a cross bar 52. The lower ends of arms 50 are pivotally connected, by pivots 53, to the upper platform side rails 20. A portion of the rear side of can L' projects rearwardly between the side arms 50 and is embracingly engaged thereby to cradle the can L' in centered relation to the platform 10 and to prevent lateral shifting from this centered position during travel of the truck.

Latch unit E is of yoke form, including side arms 55 connected by pivots 56 to respective handle arms 50, and including a cross bar 57 which may be looped upwardly in its central region 58 to provide a handle for actuating the latch. Extending transversely between and secured to the side arms 55 is a latch bar 59 which is spaced forwardly from the cross bar 57 to define with the end portions thereof, latch recesses 60 in which the rear end yoke 25, 26 of chassis frame A is receivable, with a frictional grip of the cross bar 57 and latch bar 59 against opposite sides of the yoke arms 25 (FIG. 8). By grasping the handle portion 58 of the latch unit and pulling upwardly and rearwardly thereon, it may be disengaged from the rear end yoke 25, and the handle unit D may then be folded forwardly to the folded position shown in FIG. 3.

In a normal loading position, the truck will be disposed as shown in FIGS. 1 and 2, with the forward lower platform 11 resting flatly against the ground G and with the handle D extending vertically upwardly. In this position, the rearward chassis arms 15 are inclined upwardly at the proper angle to intersect the axis of wheel unit B, and their rearward extremities 27 are bent upwardly at a steeper angle so as to be substantially parallel to and spaced slightly above a plane tangent to the under sides of wheels 30, so as to engage the ground at G' in a rearwardly tilted rest position of the truck. In this position, the truck has been tilted rearwardly approximately 45° from its upstanding position. In some situations it will be found convenient to rest the truck in this position for loading and unloading.

FIGS. 7 and 8 illustrate a modified form of the invention wherein a single travel wheel 30' is mounted between vertical offsets 65 in wheel frame rails which comprise lower forward portions 15' converging rearwardly from forward platform rails 16, and upper ear portions 15'' converging forwardly from rear platform rails 10. Thus the offsets 65 are spaced apart just enough to receive the wheel 30' between them.

FIG. 7 also illustrates a modified swinging yoke C' comprising side arms 35' terminating in bent forward ends 37' which project forwardly to engage trash can L in the upstanding position of the yoke. The offsets 42' are of elongated diagonal form. Cross bar 41' forms the sole connection between arms 35'. Other features are the same as in FIGS. 1–6.

While the term "truck" has been used in the foregoing description of the invention, it is to be understood that the term "cart" may also be appropriately used and in many instances may be a preferred term to designate the device.

My improved truck or cart is especially advantageous in providing for loading two trash cans without lifting either to any substantial height. The can may be loaded upon the rear platform when the truck is in the rearwardly tilted rest position described above. When this has been accomplished, the car can be tilted forwardly to the upright position shown in FIG. 2, the swinging yoke C will then be raised to its retainer position shown in FIG. 2, and the second can may then be tilted slightly and rolled on its bottom rim onto the forward platform without lifting it. By a reversal of this procedure, the card can be unloaded without lifting the cans to any substantial extent.

The cart is useful in moving other articles such as cartons, boxes, packages, trays of garden tools, bales, and bags of peat moss, fertilizer, etc., and other bulky articles which may have to be moved around a house or yard.

When the cart is being wheeled, it will be tilted to a position intermediate the forward rest position indicated at G in FIG. 2 and the rearward rest position indicated at G', somewhat nearer the rear position than the forward position, and with the aggregate weight of cans L and L' substantially balanced above the wheel axis.

I claim:

1. In a hand truck, in combination: a chassis including a forward platform adapted to assume a horizontal position resting against a supporting surface, a wheel frame inclined upwardly and rearwardly from the rear end of said forward platform as an integral extension thereof when said platform is in said horizontal position, and a rear platform disposed above said wheel frame in upwardly and rearwardly stepped relation to said forward platform; a wheel unit attached to said wheel frame in the space defined between the plane of said rear platform and the rearwardly extended plane of said forward platform; a handle attached to said chassis near the rear end of said rear platform and having an operative position extending upwardly, said chassis including a rear end portion projecting rearwardly beyond said wheel unit, inclined upwardly and rearwardly as an extension of said wheel frame, and engageable against said supporting surface to support the truck in a rearwardly tilted position; said forward platform projecting forwardly from the area covered by said rear platform, so that a load object supported by said forward platform can extend upwardly in front of and past the forward extremities of said rear platform and of a load supported on the latter; and a platform extension hinged to the forward end of said rear platform on a transverse horizontal axis for swinging movement between a horizontal position extended forwardly over said forward platform and providing a forward extension of the supporting surface of said rear platform, and a retracted position swung rearwardly from said forwardly projecting position.

2. A truck as defined in claim 1, further including means on said extension platform projecting rearwardly from said hinge axis and engageable beneath said rearward platform to provide cantilever support for said extension platform in said extended position thereof.

3. A hand truck comprising, in combination: a chassis including a forward platform adapted to assume a horizontal position resting against a supporting surface, a wheel frame inclined upwardly and rearwardly from the rear end of said forward platform as an integral extension thereof when said platform is in said horizontal position, and a rear platform disposed above and said wheel frame in upwardly and rearwardly stepped relation to said forward platform; a wheel unit attached to said wheel frame in the space defined between the plane of said rear platform and the rearwardly extended plane of said forward platform; and a handle attached to said chassis near the rear end of said rear platform and having an operative position extending upwardly, said chassis including a rear end portion projecting rearwardly beyond said wheel unit, inclined upwardly and rearwardly as an extension of said wheel frame, and engageable against said supporting surface to support the truck in a rearwardly tilted position; said hand truck further including a platform extension member hinged to the forward end of said rear platform on a transverse horizontal axis for swinging movement between a horizontal position extended forwardly over said forward platform and providing a forward extension of the supporting surface of said rear platform, and a raised position projecting upwardly from the forward end of said rear platform, providing a back rest for a load article resting on said forward platform, and providing a forward retainer gate for a load article supported on said rear platform.

4. A truck comprising, in combination: a chassis including a forward platform adapted to assume a horizontal position resting against a supporting surface, a wheel frame inclined upwardly and rearwardly from the rear end of said forward platform as an integral extension thereof when said platform is in said horizontal position, and a rear platform disposed above said wheel frame in upwardly and rearwardly stepped relation to said forward platform; a wheel unit attached to said wheel frame in the space defined between the plane of said rear platform and the rearwardly extended plane of said forward platform; and a handle attached to said chassis near the rear end of said rear platform and having an operative position extending upwardly, said chassis including a rear end portion projecting rearwardly beyond said wheel unit, inclined upwardly and rearwardly as an extension of said wheel frame, and engageable against said supporting surface to support the truck in a rearwardly tilted position; said hand truck, including hinge means attaching the lower end of said handle unit to said chassis on a transverse axis for swinging movement from said operative position forwardly and downwardly to a folded position closely overlying said chassis; and a latch yoke hinge to said handle on a transverse axis above said hinge axis, said yoke including jaw means defining laterally-opposed latch recesses in which the rear end portion of said chassis is receivable, said jaw means frictionally gripping said rear end portion.

5. In a hand truck in combination: a chassis including laterally spaced longitudinally extending rails providing a forward platform adapted to assume a horizontal position resting against a supporting surface, a wheel frame comprising integral extensions of said rails inclined upwardly and rearwardly from the rear end of said forward platform when the same is in said horizontal position; a rear platform disposed above said wheel frame in upwardly and rearwardly stepped relation to said forward platform, said rear platform comprising laterally spaced longitudinal rails parallel to said forward platform rails in a plane above the same, and upright forward legs bent downwardly from the forward ends of said longitudinal rails and secured to the rear ends of the respective forward platform rails forwardly of the points where said upwardly and rearwardly inclined extensions of said rails are joined to said forward platform, whereby a trash can supported upon said forward platform can be engaged at its rear side between said upright landings and thereby positioned against lateral displacement on said forward platform, the rear ends of said longitudinal rails being secured to the rear end of said wheel frame; a wheel unit attached to said wheel frame in the space defined between the plane of said rear platform and rearwardly extended plane of said forward platform; and a handle attached to said chassis near the rear end of said rear platform and having an operative position extending upwardly, said chassis including a rear end portion projecting rearwardly beyond said wheel unit, inclined upwardly and rearwardly as an extension of said wheel frame, and engageable against said supporting surface to support the truck in a rearwardly tilted position; said forward platform projecting forwardly from the area covered by said rear platform, so that a load object supported by said forward platform can extend upwardly in front of and past the forward extremities of said rear platform and of a load supported on the latter.

6. A truck as defined in claim 5, wherein said handle is of yoke form including a transverse hand-grip portion and side arms projecting therefrom and terminating in parallel lower portions attached to the rearward platform at the rear end thereof, the space between said side arms being unobstructed from the plane of said rearward platform to a height such that a trash can seated upon said rearward platform can be engaged at its rear side between said side bars and thereby positioned on said rearward platform.

References Cited by the Examiner
UNITED STATES PATENTS

| | | | |
|---|---|---|---|
| 957,840 | 5/1910 | Bjorklund | 280—47.27 X |
| 2,624,588 | 1/1953 | Jones | 280—47.3 X |
| 2,673,671 | 3/1954 | Williams | 280—47.35 X |
| 2,745,673 | 5/1965 | Koepke et al. | 280—47.24 X |
| 2,792,233 | 5/1937 | Stackhouse | 280—47.28 |
| 2,818,955 | 1/1957 | Stackhouse | 280—47.29 X |
| 2,845,278 | 7/1958 | Breeler | 280—47.29 X |

BENJAMIN HERSH, *Primary Examiner.*

J. A. PEKAR, *Assistant Examiner.*